United States Patent
Wu

(10) Patent No.: US 8,306,929 B2
(45) Date of Patent: Nov. 6, 2012

(54) EMOTION ENGINE, EMOTION ENGINE SYSTEM AND ELECTRONIC DEVICE CONTROL METHOD

(75) Inventor: Li-Wei Wu, Taipei (TW)

(73) Assignee: Phison Electronics Corp., Miaoli (TW)

( * ) Notice: Subject to any disclaimer, the term of this patent is extended or adjusted under 35 U.S.C. 154(b) by 471 days.

(21) Appl. No.: 12/685,878

(22) Filed: Jan. 12, 2010

(65) Prior Publication Data

US 2011/0131165 A1    Jun. 2, 2011

(30) Foreign Application Priority Data

Dec. 2, 2009    (TW) ............................... 98141218 A

(51) Int. Cl.
*G06F 15/18* (2006.01)
(52) U.S. Cl. ......................................................... 706/14
(58) Field of Classification Search ........................ None
See application file for complete search history.

(56) References Cited

U.S. PATENT DOCUMENTS

| 6,604,021 B2 * | 8/2003 | Imai et al. ..................... 700/245 |
| 2002/0081937 A1 * | 6/2002 | Yamada et al. ............... 446/175 |
| 2003/0080989 A1 * | 5/2003 | Matsuda et al. .............. 345/706 |

FOREIGN PATENT DOCUMENTS

| JP | 2001-157980 | 12/2001 |
| JP | 2002049385 | 2/2002 |
| JP | 2003-089077 | 3/2003 |
| JP | 2004-174642 | 6/2004 |
| WO | 02099545 | 12/2002 |

OTHER PUBLICATIONS

"Office Action of Japan Counterpart Application", issued on Dec. 20, 2011, p. 1-p. 4, in which the listed references were cited.

* cited by examiner

*Primary Examiner* — Jeffrey A Gaffin
*Assistant Examiner* — Paulinho E Smith
(74) *Attorney, Agent, or Firm* — J.C. Patents

(57) ABSTRACT

An emotion engine and an emotion engine system adapted to an electronic device are provided. The emotion engine system includes a behavior control unit, a sensing unit, a time unit, and a behavior data bank. The behavior control unit provides a first behavior mode and a second behavior mode. When the sensing unit is enabled, it generates a trigger sensing signal or an initial sensing signal for the behavior control unit. The time unit generates a timing signal for the behavior control unit. The behavior data bank stores a plurality of behavior data, wherein the first and the second behavior modes are respectively corresponding to at least one of the behavior data. The behavior control unit determines the behavior data corresponding to the second behavior mode according to the timing signal, the trigger sensing signal and the first behavior mode. Additionally, an electronic device control method is also provided.

23 Claims, 5 Drawing Sheets

EMOTION ENGINE, EMOTION ENGINE SYSTEM AND ELECTRONIC DEVICE CONTROL METHOD

CROSS-REFERENCE TO RELATED APPLICATION

This application claims the priority benefit of Taiwan application serial no. 98141218, filed on Dec. 2, 2009. The entirety of the above-mentioned patent application is hereby incorporated by reference herein and made a part of this specification.

BACKGROUND OF THE INVENTION

1. Field of the Invention

The invention generally relates to a system and a control method thereof, and more particularly, to an electronic device control system and a control method thereof.

2. Description of Related Art

In recent years, electronic devices with artificial intelligence have been developed and brought into the market. As a result, the development of emotion technology has been more and more focused. For example, the emotion technology in electronic devices serving as robots has been a particular technology in robotics all the time and which is an integration of information engineering and control engineering.

To be specific, the core concept of emotion technology is the realization of an emotion space, wherein a robot is given the sensation and capability of interaction resembling those of a living body through different algorithms and a mimic structure, which is very different from a conventional robot that can only express its mimic sensation through a rigid appearance and simple and static interactions. Thus, the emotion technology can endue a lifeless mechanical system with an agile and meaningful interaction capability and can express the feelings of the robot, so that the mechanical system won't be too stiff during the interactions.

However, there have been many bottlenecks in the development of the emotion technology in robotics. A control unit in the control system needs to integrate a lot of information and adopt high-level artificial intelligence algorithms to process the information. Thus, it is difficult to build up an emotion engine with reduced fabricating cost (so as to meet the market demand) through the conventional techniques.

SUMMARY OF THE INVENTION

Accordingly, the invention is directed to an emotion engine that can reduce the fabricating cost of an electronic device and lively exhibit the personality of the electronic device if the electronic device is a robot.

The invention is also directed to an emotion engine system that can reduce the fabricating cost of an electronic device and lively exhibit the personality of the electronic device if the electronic device is a robot.

The invention is further directed to a control method of an electronic device, wherein the personality of the electronic device can be lively exhibited if the electronic device is a robot.

According to an exemplary embodiment of the invention, an emotion engine adapted to an electronic device and including a behavior control unit is provided. The behavior control unit includes an emotion simulation unit, wherein the emotion simulation unit receives a timing signal and a trigger sensing signal and provides a first behavior mode and a second behavior mode. The behavior control unit determines a behavior data corresponding to the second behavior mode according to the timing signal, the trigger sensing signal, and the first behavior mode, wherein the first behaviour mode and the second behavior mode are respectively corresponding to at least one of a plurality of behavior data.

According to another exemplary embodiment of the invention, an emotion engine system adapted to an electronic device is provided. The emotion engine system includes a behavior control unit, a sensing unit, a time unit, and a behavior data bank. The behavior control unit includes an emotion simulation unit, wherein the emotion simulation unit provides a first behavior mode and a second behavior mode. The sensing unit is coupled to the behavior control unit, and when the sensing unit is enabled, it generates a trigger sensing signal or an initial sensing signal for the behavior control unit. The time unit is coupled to the behavior control unit and generates a timing signal for the behavior control unit. The behavior data bank is coupled to the behavior control unit and stores a plurality of behavior data, wherein the first behaviour mode and the second behavior mode are respectively corresponding to at least one of the behavior data. The behavior control unit determines the behavior data corresponding to the second behavior mode according to the timing signal, the trigger sensing signal, and the first behavior mode.

According to an exemplary embodiment of the invention, the emotion simulation unit further generates a random signal, and the behavior control unit determines the behavior data corresponding to the second behavior mode according to the timing signal, the trigger sensing signal, the first behavior mode, and the random signal.

According to an exemplary embodiment of the invention, the behavior control unit determines the behavior data corresponding to the first behavior mode according to at least one of the timing signal and the initial sensing signal.

According to an exemplary embodiment of the invention, the emotion engine system further includes a peripheral driving unit, and the initial sensing signal is a power signal. After the behavior control unit receives the initial sensing signal, it provides the first behavior mode and drives the peripheral driving unit to execute the first behavior mode.

According to an exemplary embodiment of the invention, after the behavior control unit determines the behavior data corresponding to the second behavior mode, it drives the peripheral driving unit to execute the second behavior mode.

According to an exemplary embodiment of the invention, the timing signal includes a time length information from receiving the initial sensing signal to receiving the trigger sensing signal or a system age information of the electronic device.

According to an exemplary embodiment of the invention, the emotion simulation unit generates an emotion point and a plurality of scenario points in a virtual space, wherein each of the scenario points has a corresponding coordinate and a corresponding behaviour mode. The emotion point moves from an old coordinate to a new coordinate according to the timing signal, the trigger sensing signal, and the first behavior mode, and the emotion simulation unit determines the corresponding scenario point according to the new coordinate so as to determine the behavior data corresponding to the second behavior mode.

According to an exemplary embodiment of the invention, the behavior data stored in the behavior data bank includes image data, voice data, and exercise behavior data.

According to yet another exemplary embodiment of the invention, a control method of an electronic device is provided. The control method includes following steps. A first behavior mode is provided. A trigger sensing signal is generated when a sensing unit of the electronic device is enabled. A timing signal is generated. A behavior data corresponding to a second behavior mode is determined according to the timing signal, the trigger sensing signal, and the first behavior mode.

According to an exemplary embodiment of the invention, the control method further includes generating a random signal and determining the behavior data corresponding to the second behavior mode according to the timing signal, the trigger sensing signal, the first behavior mode, and the random signal.

According to an exemplary embodiment of the invention, the control method further includes determining a behavior data corresponding to the first behavior mode according to an initial sensing signal.

According to an exemplary embodiment of the invention, the timing signal includes a time length information from receiving the initial sensing signal to receiving the trigger sensing signal or a system age information of the electronic device.

According to an exemplary embodiment of the invention, the control method further includes analyzing the type of the trigger sensing signal.

According to an exemplary embodiment of the invention, the step of providing the first behavior mode includes providing the first behavior mode after a power signal is received and executing the first behavior mode.

According to an exemplary embodiment of the invention, a peripheral driving unit of the electronic device is driven to execute the second behavior mode after the behavior data corresponding to the second behavior mode is determined.

According to an exemplary embodiment of the invention, the step of determining the behavior data corresponding to the second behavior mode includes generating a emotion point and a plurality of scenario points in a virtual space, wherein the emotion point moves according to the timing signal, the trigger sensing signal, and the first behavior mode, and the behavior data corresponding to the second behavior mode is corresponding to the scenario point closest to the emotion point.

According to an exemplary embodiment of the invention, the control method further includes following steps. A corresponding emotion vector is obtained according to the first behavior mode, the timing signal, and the trigger sensing signal. The coordinate of the emotion point in the virtual space is modified according to the emotion vector. The scenario point closest to the emotion point is determined, and the behavior data corresponding to the second behavior mode is determined according to the scenario point.

According to an exemplary embodiment of the invention, the control method further includes providing a convergence point, and in the step of modifying the coordinate of the emotion point in the virtual space according to the emotion vector, providing a regression force to allow the emotion point to move towards the convergence point.

According to an exemplary embodiment of the invention, the coordinate of the convergence point is changed according to the timing signal.

According to an exemplary embodiment of the invention, the virtual space is a multi-dimensional space having multiple axes, the behavior control unit determines the scenario point corresponding to the new coordinate through a vector operation, and the axes of the virtual space respectively represent different behaviours of the electronic device.

According to an exemplary embodiment of the invention, the step of determining the behavior data corresponding to the second behavior mode according to the scenario point includes providing the behavior data corresponding to the second behavior mode according to a system age information and a scenario point.

As described above, embodiments of the invention provide an emotion engine and an emotion engine system that can reduce the fabricating cost of an electronic device and lively exhibit the personality of the electronic device if the electronic device is applied as a robot. Besides, the emotion engine and emotion engine system have modular structures and are not limited to any electronic device with specific appearance or design. In addition, embodiments of the invention provide an electronic device control method, wherein real-time emotional operations and a concept of emotion points are adopted such that when the electronic device is applied as a robot, the personality of the electronic device can be lively exhibited. Thereby, the market competitiveness of the electronic device is increased thanks to the reduced fabricating cost thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
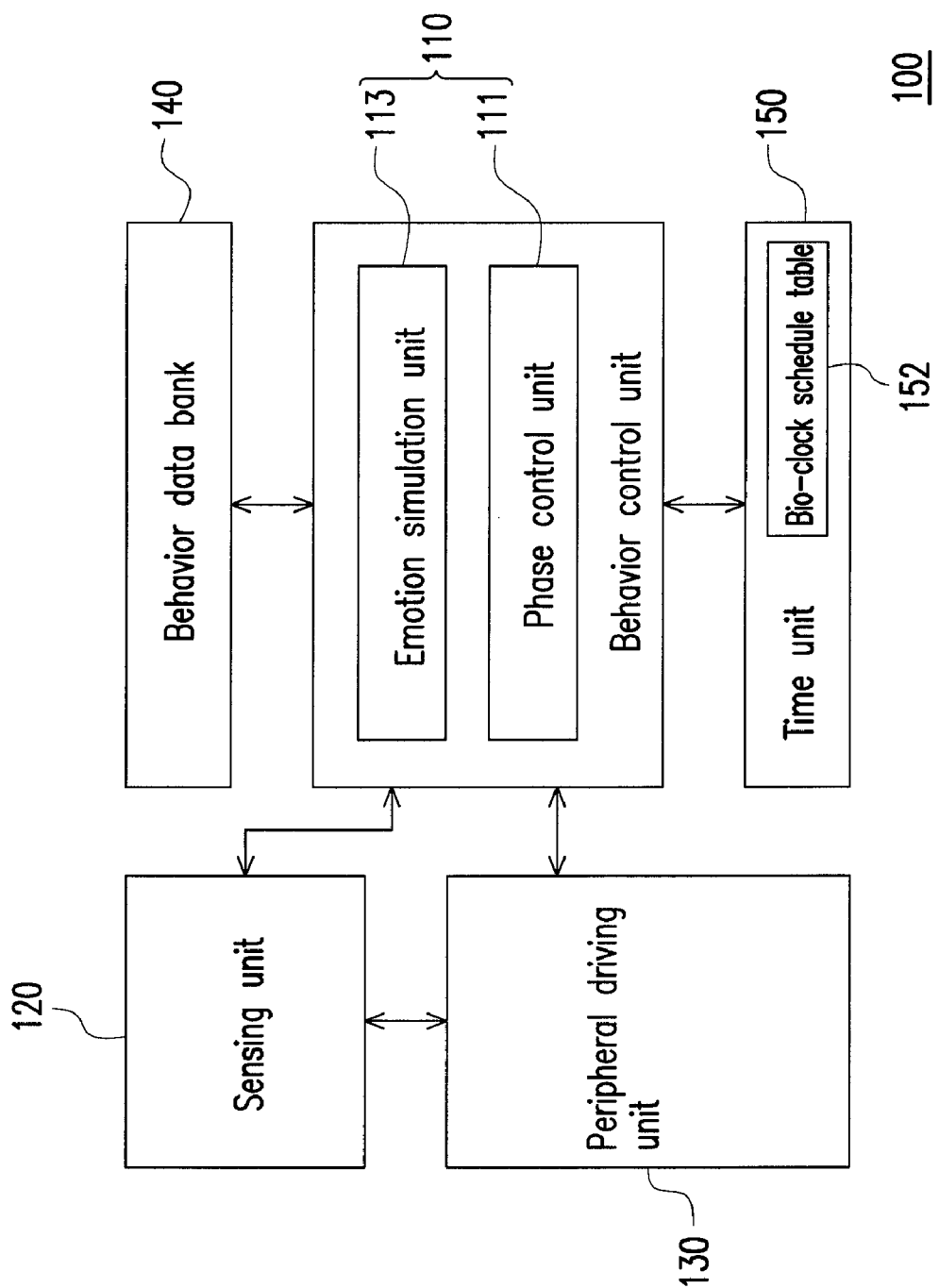
FIG. 1 is a diagram of an emotion engine system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of an emotion engine system according to an exemplary embodiment of the invention. Referring to FIG. 1, in the present exemplary embodiment, the emotion engine system 100 includes a behavior control unit 110, a sensing unit 120, a time unit 150, a behavior data bank 140, and a peripheral driving unit 130. The behavior control unit 110 includes a phase control unit 111 and an emotion simulation unit 113. The sensing unit 120, the time unit 150, and the behavior data bank 140 are respectively coupled to the behavior control unit 110 and assist the behavior control unit 110 with the provision of a first behavior mode and a second behavior mode.

In the present exemplary embodiment, the emotion engine system 100 is adapted to an electronic device with emotional responses, such as a robot or an electronic pet (not shown). Each exemplary embodiment in the present disclosure is described by taking a robot as an example of the electronic device, but the invention is not limited thereto. The emotional responses of a robot may be a response mechanism produced on the interaction between the robot and a user, a behavioural performance set by the time unit 150, or corresponding behaviours produced in response to the requirement of an external context.

Below, the operation of the emotion engine system 100 will be described in detail with reference to an exemplary embodiment.

In the present exemplary embodiment, the phase control unit 111 and the emotion simulation unit 113 may be implemented in one or multiple control circuits in a firmware, hardware or software form. For example, the behavior control unit 110 with the phase control unit 111 and the emotion simulation unit 113 may be formed by recording a plurality of control instructions into a program memory (for example, a read only memory (ROM)) and coupling the program memory to a microprocessor. When the emotion engine system 100 is in operation, the control instructions of the phase control unit 111 and the emotion simulation unit 113 are executed by the microprocessor so as to accomplish the emotion engine management mechanism in exemplary embodiments of the invention.

When the behavior control unit 110 receives an initial sensing signal, the behavior control unit 110 provides a first behavior mode and drives the peripheral driving unit 130 to execute the first behavior mode, wherein the initial sensing signal may be a power signal or other driving signals. The behavior mode exhibited by the robot may be one of a general mode, an active event mode, a passive event mode, a sleep mode, a get-up mode, and a random behavior mode. However, the invention is not limited thereto. For example, the behavior control unit 110 provides the get-up mode when the robot is powered on so that the behaviours or states of the robot are more vivid and lively, and seem like actions a living body does.

In the present exemplary embodiment, the sensing unit 120 is coupled to the behavior control unit 110. When the robot is stimulated, the sensing unit 120 is enable and generates a trigger sensing signal for the behavior control unit 110. For example, when the robot and the user interact with each other, the sensing unit 120 generates the trigger sensing signal for the behavior control unit 110 according to the interaction between the robot and the user. For example, when the robot is touched, patted, shaken, or hit by the user, the behavior control unit 110 could determine the type of the user's behavior according to the trigger sensing signal generated by the sensing unit 120 and allows the robot to exhibit a corresponding emotional response (for example, happiness, anger, or sadness).

The time unit 150 is coupled to the behavior control unit 110. In the present exemplary embodiment, the time unit 150 includes a bio-clock schedule table 152. The bio-clock schedule table 152 records system age information of the robot and generates a timing signal for the behavior control unit 110 within a certain period so that the behavior control unit 110 can control the robot to interact with the user according to different life stages of the robot. In addition, the time unit 150 also provides a time length information (the duration from the behavior control unit 110 receiving the initial sensing signal to the behavior control unit 110 receiving the trigger sensing signal) to the behavior control unit 110 after the behavior control unit 110 receives the initial sensing signal and the trigger sensing signal, so as to assist the behavior control unit 110 to determine the behavior data corresponding to the second behavior mode.

Thus, the behavior control unit 110 of the emotion engine system 100 can lively exhibit the behaviors of the robot resembling the behaviors of a living body according to the biological clock and life stage of the robot.

In the present exemplary embodiment, the behavior data bank 140 stores a plurality of behavior data, and the behavior modes of the robot are respectively corresponding to at least one of the behavior data. In the emotion technology, a piece of different behavior data could be corresponding to a different location in a coordinate system for a virtual space, and the virtual space may be the realization of an emotion space. Herein the virtual space may be a 2-dimensional (2-D) space, a 3-dimensional (3-D) space, or a multi-dimensional space, and the behavior data stored in the behavior data bank 140 may include image data, voice data, and exercise behavior data. However, the invention is not limited thereto.

In the present exemplary embodiment, the behavior control unit 110 determines the behavior data corresponding to the second behavior mode according to the timing signal, the trigger sensing signal, and the first behavior mode. For example, the time unit 150 of the emotion engine system 100 issues a timing signal at noon, and accordingly the robot produces a behavior to issue a feeding request to the user. The user feeds the robot after five minutes. The sensing unit 120 then issues a trigger sensing signal for receiving the food to the behavior control unit 110, and accordingly the behavior control unit 110 controls the robot to exhibit a corresponding emotional response. For example, if the user does not provide enough food, the behavior control unit 110 controls the robot to exhibit an emotional response of anger. Contrarily, the behavior control unit 110 controls the robot to exhibit a contented response. Herein the timing signal issued by the time unit 150 at noon is the initial sensing signal, and correspondingly the behaviour of the robot for issuing the feeding request to the user is a first behavior mode. Next, the robot waits for five minutes before it accepts the feeding from the user. This five-minute waiting is also a timing signal, and the feeding signal is a trigger sensing signal. Thus, after receiving the feeding signal, the behavior control unit 110 determines to generate an emotional response of content, anger, or demand of more food according to the calculation results or analysis of the feeding request, the waiting time, and the quantity of the food. Herein the corresponding emotional response may be corresponding to the second behavior mode. Thus, the behavior control unit 110 determines the behavior data corresponding to the second behavior mode according to the timing signal, the trigger sensing signal, and the first behavior mode.

Another exemplary embodiment will be further described. For example, the robot is patted at 11 pm. One minute later, the robot is patted again. In this case, the robot exhibits an emotional response of anger. However, if it is patted again after one hour, the robot should not be angry because a long time has elapsed since the first pat and the emotion of anger caused by first pat should be clamed. In addition, the emotional response of the robot should be a slight angry mood since the biological clock of the robot indicates that it is a sleep time.

It can be understood based on the exemplary embodiments described above that the timing signal (i.e., the time length information from receiving the initial sensing signal to receiving the trigger sensing signal), the trigger sensing signal, and the first behavior mode will affect the determination of the behavior data corresponding to the second behavior mode.

In the present exemplary embodiment, the behavior control unit 110 also provides the first behavior mode when it receives a power signal. For example, the behavior control unit 110 controls the robot to do nothing or give a greeting. However, in other exemplary embodiments, the behavior control unit 110 may also determine the behavior data corresponding to the first behavior mode according to the timing signal or the trigger sensing signal, so as to drive the robot to execute the first behavior mode. Namely, the behavior data corresponding to the first behavior mode is not limited to the behavior data determined when the robot is powered on, it may also be determined according to the timing signal or the trigger sensing signal.

To be specific, in the present exemplary embodiment, the behavior control unit 110 includes the emotion simulation unit 113.

The emotion simulation unit 113 generates a virtual space having an emotion point and a plurality of scenario points. The emotion point and the scenario points are respectively corresponding to a coordinate point in the virtual space. The emotion point moves according to the timing signal and the initial sensing signal. The behavior control unit 110 finds the scenario point closest to the new location of the emotion point to determine the first behavior mode. Besides, the emotion point may move to another coordinate point according to the first behavior mode, the timing signal, and the trigger sensing signal. In this case, the behavior control unit 110 finds the scenario point closest to the new location of the emotion point once again to determine the behavior data corresponding to the second behavior mode. Herein the behavior data stored in the behavior data bank 140 is respectively corresponding to different scenario points in the virtual space. Namely, each of the scenario points is corresponding to a coordinate point in the virtual space, and the emotion point moves in the virtual space according to different signals. In addition, the emotion simulation unit 113 obtains the scenario point closest to the emotion point through a mathematical algorithm, so as to determine the behavior data corresponding to the second behavior mode. This aspect will be further described below with reference to another exemplary embodiment of the invention.

In another exemplary embodiment, the emotion simulation unit 113 further generates a random signal. The emotion point also moves according to the random signal so that the inner mood changes of the robot are also exhibited besides the emotional responses of the robot to external signals. Thereby, a diversified and personalized behavior mode is produced. On the other hand, in the present exemplary embodiment, the behavior control unit 110 determines the behavior data corresponding to the second behavior mode according to the timing signal, the trigger sensing signal, the first behavior mode, and the random signal. Similarly, the behavior control unit 110 may also determine the behavior data corresponding to the first behavior mode according to the timing signal, the initial sensing signal, and the random signal.

In yet another exemplary embodiment, the behavior control unit 110 further includes a phase control unit 111. The phase control unit 111 adjusts the behavior data corresponding to the first behaviour mode or the second behavior mode provided by the behavior control unit 110 according to the timing signal provided by the time unit 150. The timing signal may indicate whether the robot is at an adult stage or a child stage, wherein the robot may have different emotional responses with respect to the same trigger sensing signal when the robot is at different life stages. For example, a robot at the adult stage may exhibit an emotional response of rage when it is patted, while a robot at the child stage may exhibit an emotional response of angry and sadness.

Figure 2:
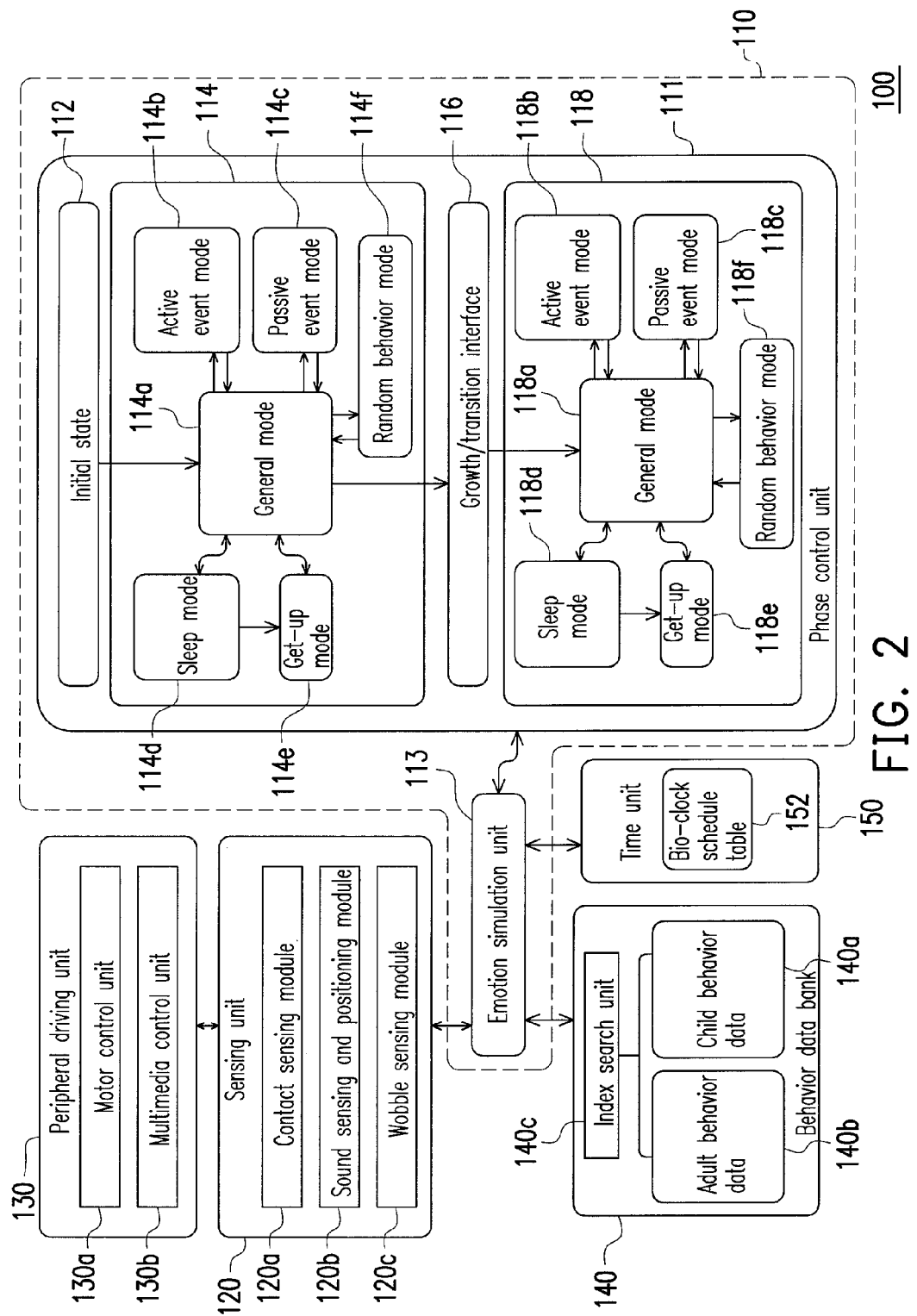
FIG. 2 is a detailed diagram of the emotion engine system in FIG. 1.

FIG. 2 is a detailed diagram of the emotion engine system in FIG. 1. Referring to FIG. 2, in the present exemplary embodiment, the phase control unit 111 includes a child timing module 114 and an adult timing module 118. Each of the timing modules includes a plurality of behavior modes. For example, the child timing module 114 includes a general mode 114a, an active event mode 114b, a passive event mode 114c, a sleep mode 114d, a get-up mode 114e, and a random behavior mode 114f. Similarly, the adult timing module 118 also includes foregoing modes.

To be specific, the phase control unit 111 can lively exhibit the behaviours of the robot in different timing modules according to the system age of the robot, just like the behaviors or states exhibited by a living body in different life stages. For example, after the emotion engine system 100 is initialized, the life stage of the robot enters from an initial state 112 into the child timing module 114 according to the system age of the robot recorded in the bio-clock schedule table 152 of the time unit 150, so as to execute the corresponding behavior mode. After that, the timing module of the phase control unit 111 is switched to the adult timing module 118 through a growth/transition interface 116 along with the growth of the system age of the robot.

In the child timing module 114, the phase control unit 111 controls the behaviour of the robot randomly or according to the timing signal received from the time unit 150. For example, when the phase control unit 111 executes the active event mode 114b, it controls the robot to issue an active request to the user and requires the active request to be fulfilled. In the present exemplary embodiment, such an event that the robot issues the active request to the user and requires the active request to be fulfilled may be that the robot feels hungry after a predetermined or a random time and accordingly issues a feeding request, or the robot issues a urine request after it is fed. In addition, the active event mode 114b may also be that the phase control unit 111 controls the robot to read a book or newspaper.

In addition, while executing the passive event mode 114c, the phase control unit 111 controls the robot to exhibit a corresponding response to a behaviour state passively received by the robot. For example, when the robot is touched, knocked down, or patted, the phase control unit 111 controls the robot to exhibit a happy, painful, or joyful appearance according to the system age of the robot recorded in the bio-clock schedule table 152 and the scenario points of the emotion simulation unit 113. Additionally, in the random behavior mode 114f, the phase control unit 111 controls the robot to execute various random behaviour modes, such as a playing mode or a roaming mode. In the present exemplary embodiment, when the phase control unit 111 is switched to the child timing module 114, the phase control unit 111 still controls the robot to execute the general mode 114a, the sleep mode 114d, and the get-up mode 114e according to the biological clock of the robot recorded in the bio-clock schedule table 152.

Thereafter, along with the growth of the system age of the robot, the timing module of the phase control unit 111 is switched to the adult timing module 118 through the growth/transition interface 116. Similarly, in the adult timing module 118, the phase control unit 111 also drives the peripheral driving unit 130 independently or along with the emotion simulation unit 113 to control the robot to exhibit different emotional responses corresponding to different behavior modes. It should be noted that in the adult timing module 118, the emotional responses exhibited by the robot corresponding to different behavior modes may be different from those exhibited by the robot in the child timing module 114. For example, the robot requires a shorter sleep time in the sleep mode 118d than in the sleep mode 114d, and besides, the robot stays in bed for a shorter time in the get-up mode 118e than in the get-up mode 114e. However, the invention is not limited thereto. In other embodiments, the behavior modes in different timing modules can be slightly adjusted according to the corresponding behaviors and states exhibited by a living body at different life stages.

Thus, the phase control unit 111 can generate emotional responses in different timing modules by sharing the virtual space and control a peripheral system by driving the peripheral driving unit 130. Accordingly, the phase control unit 111 can lively exhibit the behaviors of the robot in different timing modules according to the system age of the robot, just like the corresponding behaviors and states exhibited by a living body at different life stages.

Referring to FIG. 2, in the present exemplary embodiment, the time unit 150 includes a bio-clock schedule table 152 for recording the system age and biological block of the robot, and the time unit 150 is capable of switching the timing modules of the phase control unit 111 according to a timing signal. In addition, the bio-clock schedule table 152 records an emulational life cycle and a biological clock cycle, wherein the emulational life cycle simulates the behaviors and states exhibited by a living body at different life stages, and the biological clock cycle simulates the daily activities of the living body. In the present exemplary embodiment, the emulational life cycle and the biological clock cycle are pre-stored in the bio-clock schedule table 152. However, the invention is not limited thereto.

The time unit 150 switches the timing module of the phase control unit 111 according to the relationship between the system age and the emulational life cycle. For example, the time unit 150 switches the timing module of the phase control unit 111 from the child timing module 114 to the adult timing module 118 along with the growth of the system age. To be specific, after the emotion engine system 100 is initialized, the system age of the robot recorded in the bio-clock schedule table 152 is 0. Subsequently, the bio-clock schedule table 152 keeps recording the system age of the robot along with the lapse of time. For example, the system age of the robot recorded in the bio-clock schedule table 152 is 1 after one day actually elapses. Accordingly, the system age of the robot is 2 after two days elapse, and so on. However, the invention is not limited thereto.

Next, the time unit 150 switches the timing module of the phase control unit 111 according to the relationship between the system age and the emulational life cycle. For example, if the emulational life cycle determines that the robot enters adulthood when the system age thereof is 20, the time unit 150 switches the timing module of the phase control unit 111 to the adult timing module 118 when twenty days actually elapse. Accordingly, along with the growth of the system age of the robot, the timing module of the phase control unit 111 is switched to the adult timing module 118 through the growth/transition interface 116.

Additionally, while receiving a timing signal from the time unit 150, the phase control unit 111 controls the robot to execute a corresponding one of aforementioned behavior modes according to the relationship between the biological clock of the robot and the biological clock cycle. To be specific, if the biological clock cycle determines that the get-up mode is executed at 7 am, the time unit 150 provides the timing signal to the phase control unit 111 when it is actually 7 am so that the phase control unit 111 controls the robot to execute the get-up mode. Similarly, if the biological clock cycle determines that the sleep mode is executed at 7 pm, the phase control unit 111 controls the robot to execute the sleep mode according to the timing signal when it is actually 7 pm. A user can predetermine in the biological clock cycle that the robot executes a corresponding one of aforementioned behavior modes at a specific time.

Accordingly, the emotion engine system 100 can lively exhibit the behaviors of the robot in different timing modules and control the robot to execute a predetermined behavior mode at a specific time (just like the state exhibited by a living body at different life stages and the corresponding biological behavior of the living body at different time) according to the relationship between the system age and the emulational life cycle and the relationship between the biological clock and the biological clock cycle.

In the present exemplary embodiment, the sensing unit 120 detects or senses different enabling signals and provides a corresponding initial sensing signal or a trigger sensing signal to the behavior control unit 110. The sensing unit 120 includes a contact sensing module 120a, a sound sensing and positioning module 120b, and a wobble sensing module 120c.

The peripheral driving unit 130 is controlled by the behavior control unit 110 to drive a peripheral device to execute a corresponding operation. The peripheral driving unit 130 includes a motor control unit 130a and a multimedia control unit 130b.

For example, when the user gives forth a clap sound around the robot, the sound sensing and positioning module 120b of the sensing unit 120 is enabled and detects the position of the user who gives forth the clap sound to issue a sensing signal to the behavior control unit 110. Accordingly, the behavior control unit 110 drives the motor control unit 130a to move the robot towards the detected position. After that, when the robot reaches the position where the user gives forth the clap sound, the multimedia control unit 130b drives the robot to issue a predetermined sound so as to interact with the user. Herein if the user touches or shake the robot, the contact sensing module 120a or the wobble sensing module 120c issues a corresponding sensing signal to the behavior control unit 110 so that the behavior control unit 110 drives the multimedia control unit 130b to allow the robot to interact with the user furthermore.

The behavior data bank 140 stores the behavior data corresponding to the behavior modes in each timing module and the behavior data corresponding to the emotional responses of the robot, wherein the behavior data is respectively corresponding to a plurality of scenario points in the virtual space. Besides, the behavior data stored in the behavior data bank 140 includes image data, voice data, or exercise behavior data. In the present exemplary embodiment, the image data may be a dot array of light emitting diode (LED) pixels. The voice data may be sound effect information related to different scenes, and which may be adjusted through media chips to meet the requirements of different context changes. The exercise behavior data may be information related to sundry motor step angles or tracks.

To be specific, in the present exemplary embodiment, the behavior data bank 140 stores image data, voice data, and exercise behavior data corresponding to the behavior modes in the child timing module 114. Thus, when the behavior control unit 110 controls the robot to execute different behavior modes through the peripheral driving unit 130, the robot exhibits corresponding emotional responses according to the behavior data 140a stored in the behavior data bank 140. Accordingly, the emotion engine system 100 can lively exhibit the behaviors of the robot. Similarly, the behavior data bank 140 also stores the behavior data 140b corresponding to the behavior modes in the adult timing module 118 so that the behaviours of the robot in the adult timing module 118 can also be lively exhibited.

Thereby, the behavior control unit 110 in the present embodiment can determine the behavior data corresponding to a first behavior mode according to the timing signal and the initial sensing signal or determine the behavior data corresponding to a second behavior mode according to the timing signal, the trigger sensing signal, and the first behavior mode.

Figure 3:
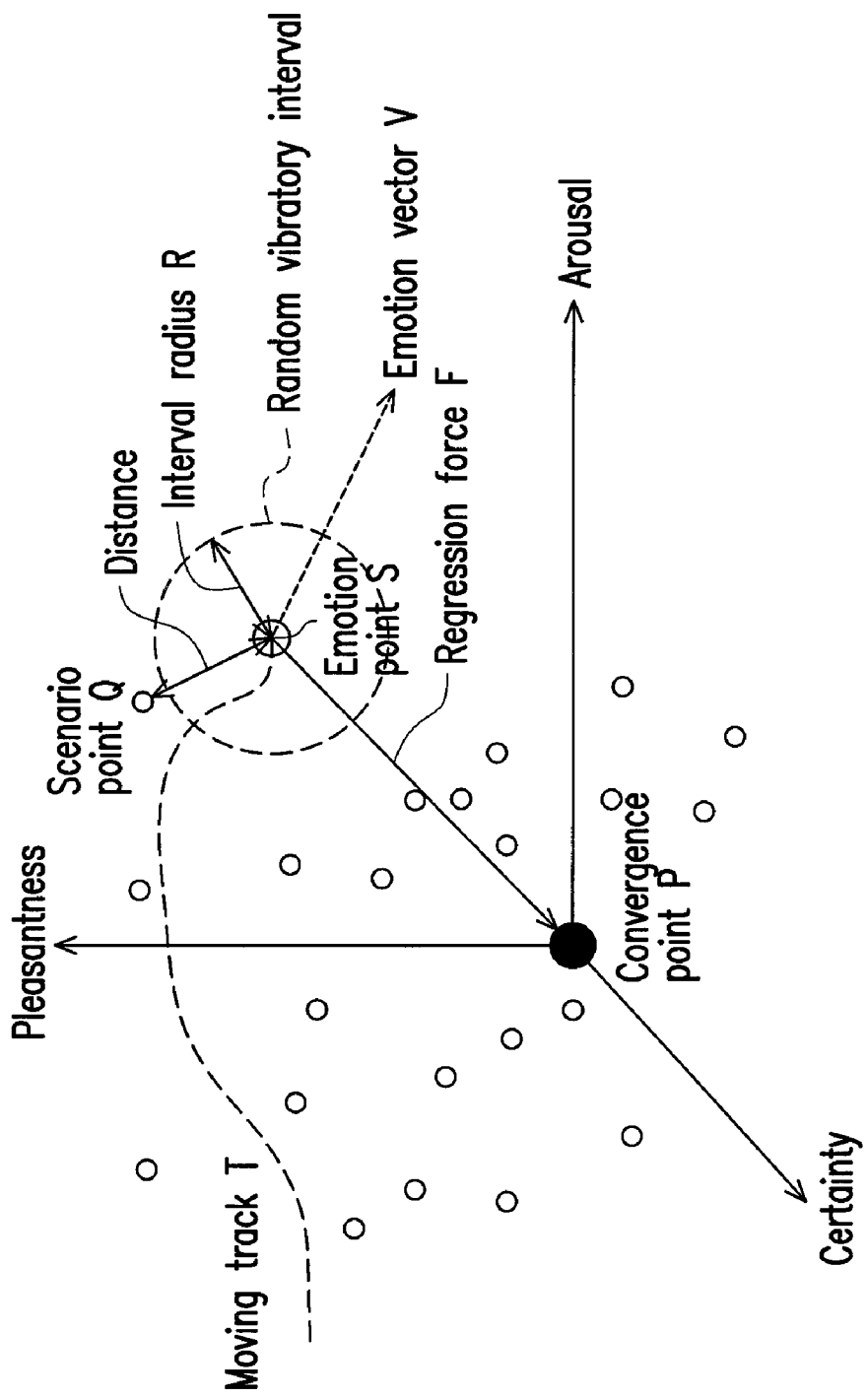
FIG. 3 is a diagram illustrating the emotional response of a robot in a virtual space.

FIG. 3 is a diagram illustrating the emotional response of a robot in a virtual space. Referring to both FIG. 2 and FIG. 3, in the present exemplary embodiment, the virtual space is a 3-D space generated by the behavior control unit 110, wherein the axes of the virtual space respectively represent the pleasantness, arousal, and certainty of the robot for expressing emotional scalar values of an emulational living body. However, the invention is not limited thereto, and the virtual space may also be a 2-D or a multi-dimensional space. In addition, in another exemplary embodiment, the axes may represent angriness, sadness, confusion, intellectuality, or other different emotional behaviors.

It should be noted that in the virtual space, the axes APC (arousal, pleasantness, and certainty) represent a psychological concept, different emotion points of an emulational living body in the virtual space have different coordinate points, and each emotion point is corresponding to different behavior mode. Besides, in the virtual space, the emotion point S represents a current emotional state of the robot. For example, when the robot interacts with the user, the emotional response of the robot affects the position of the emotion point. In addition, the behaviours set by the biological clock in the emotion engine system 100 and the corresponding behaviors produced in response to external contexts will all affect the position of the emotion points.

Herein the behavior data stored in the behavior data bank 140 is respectively corresponding to a plurality of scenario points Q in the virtual space. In the present exemplary embodiment, the emotion point S randomly produces an offset within an interval radius R so as to form a random vibratory interval moving along with the emotion point S, so that the emotional response of the robot won't be too stiff. Additionally, with the elapse of time, the emotion simulation unit 113 in the behavior control unit 110 controls the emotional response of the robot to form a moving track T in the virtual space, so as to simulate the emotional responses of a living body in different circumstances. To be specific, the emotion simulation unit 113 performs a numerical calculation in response to the any external environmental change and generates an emotion vector V in the virtual space for pushing the emotion point S, so as to simulate the emotion change of an emulational living body. Herein the external environmental change may be obtained by quantizing the timing signal, the initial sensing signal, the trigger sensing signal, the first behavior mode, and the random signal. However, the invention is not limited thereto.

In another exemplary embodiment, the virtual space produced by the behavior control unit 110 further contains a convergence point P. The convergence point P is located at the origin or any coordinate point of the virtual space, and which represents the personality of the robot. For example, the robot has an outgoing and rational personality if the coordinate of the convergence point P has greater pleasantness and certainty. Contrarily, the robot has a stiff and stubborn personality if the coordinate of the convergence point P has smaller pleasantness and greater certainty. Herein the convergence point P provides a virtual regression force in real time. In other words, the convergence point P provides the regression force according to the timing signal. Before the robot receives any sensing signal, the emotion point S moves towards the convergence point P to simulate the situation that the emotional response of the robot gradually returns to the original personality of the robot when no external stimulation is received. When the robot is stimulated, the convergence point P provides the regression force to the behavior control unit 110 to determine an appropriate behavior mode, so as to simulate different emotional responses produced when the robot having different personalities receive the same event. In other words, the time length information between the reception of the initial sensing signal and the reception of the trigger sensing signal also affects the behavior data corresponding to the second behavior mode due to the regression force of the convergence point P.

In yet another exemplary embodiment, in order to achieve the diversified emotional personality of an emulational living body, the behavior control unit 110 further controls the convergence point P to move at regular intervals or in an irregular pattern, so as to achieve the characteristic of converging towards the personality of the robot. For example, the behavior control unit 110 moves the convergence point P to a coordinate point with lower pleasantness, arousal, and certainty during a predetermined biological period according to information of the time unit 150. Or, the behavior control unit 110 controls the convergence point P to move to different coordinate positions during the childhood or the adulthood of the robot. By doing so, the behavior control unit 110 allows the robot to exhibit an emotional appearance resembling that of a living body.

To be more specific, when the robot is stimulated, the emotion simulation unit 113 generates an emotion vector V for the emotion point S according to the stimulation and the convergence point P provides a regression force F to the emotion point S, so that the emotion point S moves to another coordinate point. Next, the emotion simulation unit 113 determines which scenario point Q is currently closest to the emotion point S, so as to determine the behavior mode to be executed.

In the present exemplary embodiment, in the virtual space, the scenario points Q record the expressed characteristics of a specific emotion, wherein the expressed characteristics of the specific emotion may be the behaviors of the robot when the robot is happy, excited, frightened, or sad.

For example, when the user gives forth a clap sound around the robot, the clap sound is considered by the behavior control unit 110 as an external stimulation or an interaction with the user. Then, the emotional response of the robot starts from an emotion point S in the virtual space, and through the operations of the emotion simulation unit 113, the emotion points S form a moving track with the lapse of time. During the emotional operation process, an emotion point S selects the current emotional response of the robot according to the closest distance between the emotion point S and the scenario points Q. After that, the emotion of the robot is restored under the regression force F of the convergence point P.

The robot may be stimulated again and accordingly exhibit a specific emotional response during foregoing process. For example, the robot exhibits a happy emotion when it is stimulated by the first clap sound, and the robot exhibits a helpless or bewildered emotion when it is stimulated by another clap sound during the emotional operation process.

In the present exemplary embodiment, the emotion simulation unit 113 can perform the emotional operation even if the robot does not receive any stimulation, so that the robot can exhibit diversified emotional responses and accordingly won't look so stiff.

Additionally, in the present exemplary embodiment, the scenario points in the virtual space can be increased by increasing the behavior data stored in the behavior data bank 140 so as to achieve variations in the personality of the robot. Besides, the behavior data stored in the behavior data bank 140 could be independent from each other, and each context index relationship is marked in the virtual space through an index search unit 140c. The behavior data bank 140 can categorize the behavior data according to different behaviors and emotional responses and switch to the corresponding behavior data according to the requirement of the phase control unit 111.

Figure 4:
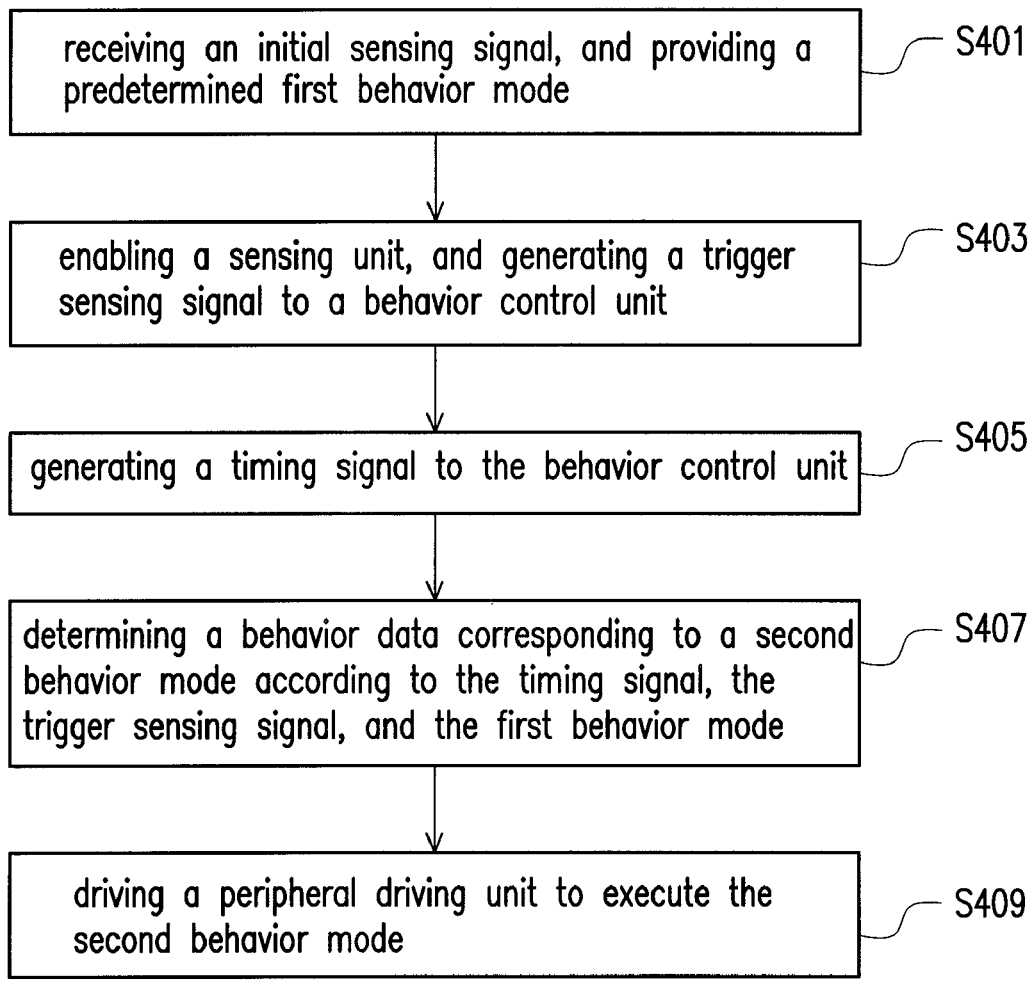
FIG. 4 is a flowchart of an electronic device method according to an embodiment of the invention.

An electronic device control method will be described below with reference to the embodiments described above. FIG. 4 is a flowchart of an electronic device method according to an embodiment of the invention. In the present exemplary embodiment, the control method is adapted to a robot with emotional responses. The control method includes following steps.

First, in step S401, a first behavior mode is provided by the behavior control unit 110. Herein the behavior control unit 110 receives an initial sensing signal and provides a predetermined first behavior mode once it is powered on. In the present exemplary embodiment, the initial sensing signal may be a power signal. However, the invention is not limited thereto.

Next, in step S403, when the sensing unit 120 is enabled, a trigger sensing signal is generated to the behavior control unit 110. Herein the emotion engine system 100 obtains environmental information through the sensing unit 120 so as to identify the type of the interactive behaviour received from the external environment. Namely, the sensing unit 120 is enabled when the robot receives an external stimulation.

After that, in step S405, a timing signal is generated by the time unit 150 to the behavior control unit 110, so as to switch the timing module of the phase control unit 111 or other information for determining the second behaviour mode. Herein the information for determining the second behaviour mode may be the time length information between the reception of the initial sensing signal and the reception of the trigger sensing signal. In other exemplary embodiments, step S405 may be executed before step S403 to provide the timing signal.

Next, in step S407, the behavior data corresponding to the second behavior mode is determined according to the timing signal, the trigger sensing signal, and the first behavior mode. Herein the behavior data corresponding to the second behavior mode may be determined through emotional operations of the emotion simulation unit 113. Namely, the current emotional response of the robot is determined through the emotional operations of the emotion simulation unit 113.

Finally, in step S409, the peripheral driving unit 130 is driven to execute the second behavior mode. After that, the emotion point S moves towards the convergence point P under the regression force F of the convergence point P.

In another embodiment, a random signal is further generated, and the behavior data corresponding to the second behavior mode is determined according to the timing signal, the trigger sensing signal, the first behavior mode, and the random signal.

Figure 5:
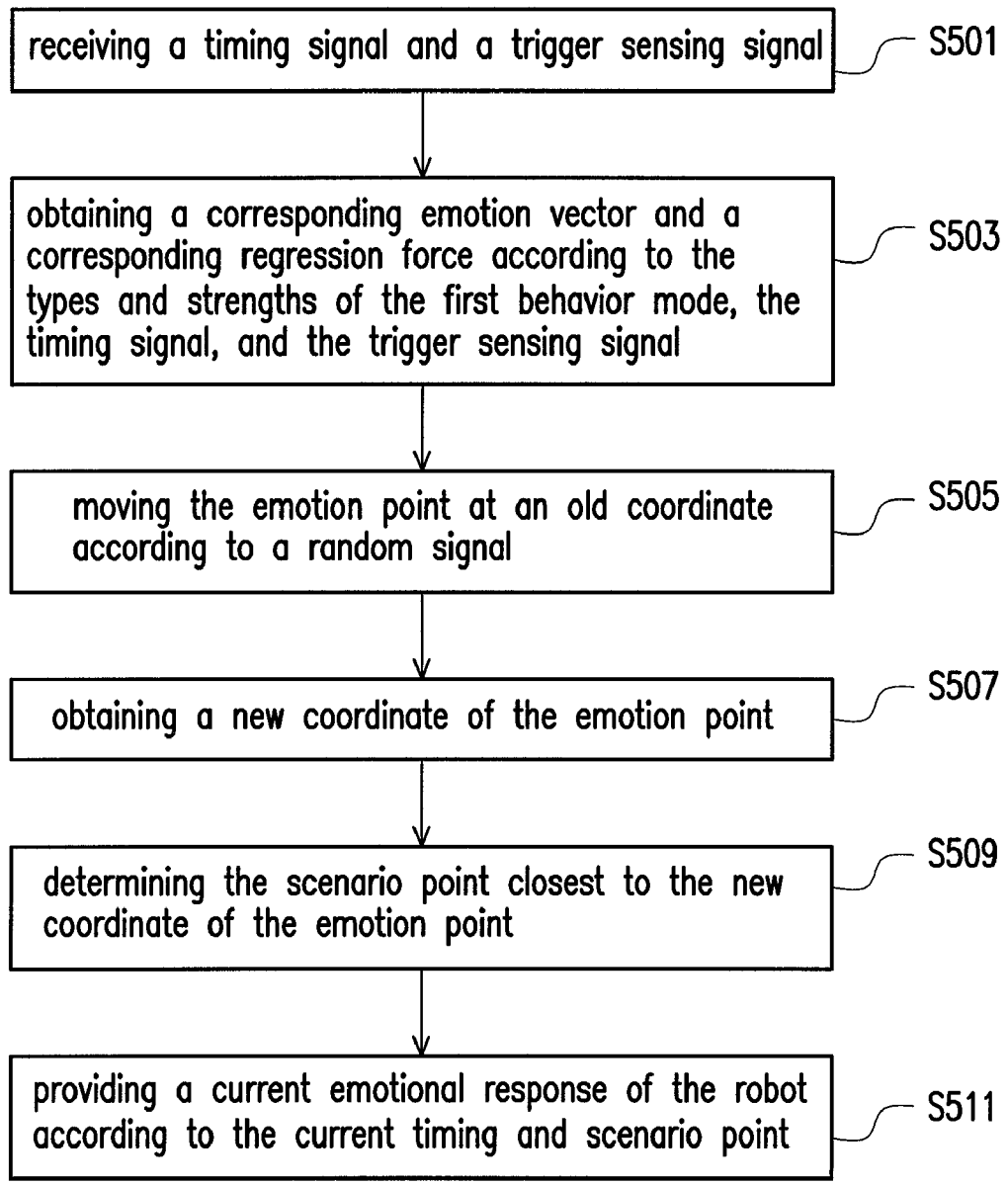
FIG. 5 is a detailed flowchart of step S407.

FIG. 5 is a detailed flowchart of step S407. Referring to FIG. 5, in step S501, the timing signal and the trigger sensing signal are received through the behavior control unit 110. Then, in step S503, a corresponding emotion vector V and a corresponding regression force F are obtained according to the types or strengths of the first behavior mode, the timing signal, and the trigger sensing signal through emotional operations of the emotion simulation unit 113. Next, in step S505, the emotion point S located at the old coordinate is moved according to the random signal provided by the emotion simulation unit 113, so as to obtain a new coordinate of the emotion point S, as shown in step S507. After that, in step S509, the scenario point closest to the new coordinate of the emotion point S is found by the emotion simulation unit 113 and provided to the scenario point to the phase control unit 111. In step S511, the current emotional response of the robot is provided by the phase control unit 111 according to the current timing and the scenario point.

It should be mentioned that the behavior data corresponding to the first behavior mode may also be determined according to the timing signal or the initial sensing signal besides being the behavior data determined when the robot is powered on.

As described above, exemplary embodiments of the invention provide an emotion engine and an emotion engine system, wherein the personality of an electronic device can be lively described and exhibited, and a modular structure is provided so that the application of the emotion engine and the emotion engine system is not limited to electronic devices with specific appearance and design. In addition, exemplary embodiments of the invention provide an electronic device control method, wherein real-time emotional operations and a concept of convergence point are adopted so that the personality of an electronic device can be lively described and exhibited.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An emotion engine, adapted to an electronic device, the emotion engine comprising:
   a behavior control circuit comprising an emotion simulation circuit, wherein the emotion simulation circuit receives a timing signal and a trigger sensing signal and provides a first behavior mode and a second behavior mode, and the behavior control circuit determines a behavior data corresponding to the second behavior mode according to the timing signal, the trigger sensing signal, and the first behavior mode,
   wherein the first behavior mode and the second behavior mode are respectively corresponding to at least one of a plurality of behavior data
   wherein the emotion simulation circuit generates an emotion point and a plurality of scenario points in a virtual space, each of the scenario points has a corresponding coordinate and a corresponding behavior mode, the emotion point moves from an old coordinate to a new coordinate according to the timing signal, the trigger sensing signal, and the first behavior mode, and the emotion simulation circuit obtains the corresponding scenario point according to the new coordinate so as to determine the behavior data corresponding to the second behavior mode.

2. The emotion engine according to claim 1, wherein the emotion simulation circuit further generates a random signal, and the behavior control circuit determines the behavior data corresponding to the second behavior mode according to the timing signal, the trigger sensing signal, the first behavior mode, and the random signal.

3. The emotion engine according to claim 1, wherein the behavior control circuit further determines the behavior data corresponding to the first behavior mode according to an initial sensing signal.

4. The emotion engine according to claim 3, wherein the timing signal comprises a time length information from receiving the initial sensing signal to receiving the trigger sensing signal or a system age information of the electronic device.

5. The emotion engine according to claim 3, wherein the initial sensing signal is a power signal, and the behavior control circuit provides the first behavior mode and drives a peripheral driving circuit to execute the first behavior mode after the behavior control circuit receives the initial sensing signal.

6. The emotion engine according to claim 1, wherein the behavior control circuit further drives a peripheral driving circuit to execute the second behavior mode after the behavior control circuit determines the behavior data corresponding to the second behavior mode.

7. An emotion engine system, adapted to an electronic device, the emotion engine system comprising:
- a behavior control circuit comprising an emotion simulation circuit, wherein the emotion simulation circuit provides a first behavior mode and a second behavior mode;
- a sensing circuit coupled to the behavior control circuit and generating a trigger sensing signal or a initial sensing signal to the behavior control circuit when the sensing circuit is enabled;
- a time circuit coupled to the behavior control circuit and generating a timing signal to the behavior control circuit; and
- a behavior data bank coupled to the behavior control circuit and storing a plurality of behavior data,
- wherein the first behavior mode and the second behavior mode are respectively corresponding to at least one of the behavior data, and the behavior control circuit determines the behavior data corresponding to the second behavior mode according to the timing signal, the trigger sensing signal, and the first behavior mode,
- wherein the emotion simulation circuit generates an emotion point and a plurality of scenario points in a virtual space, each of the scenario points has a corresponding coordinate and a corresponding behavior mode, the emotion point moves from an old coordinate to a new coordinate according to the timing signal, the trigger sensing signal, and the first behavior mode, and the emotion simulation circuit obtains the corresponding scenario point according to the new coordinate so as to determine the behavior data corresponding to the second behavior mode.

8. The emotion engine system according to claim 7, wherein the emotion simulation circuit further generates a random signal, and the behavior control circuit determines the behavior data corresponding to the second behavior mode according to the timing signal, the trigger sensing signal, the first behavior mode, and the random signal.

9. The emotion engine system according to claim 7, wherein the behavior control circuit determines the behavior data corresponding to the first behavior mode according to at least one of the timing signal and the initial sensing signal.

10. The emotion engine system according to claim 7, further comprising a peripheral driving circuit, wherein the initial sensing signal is a power signal, and the behavior control circuit provides the first behavior mode and drives the peripheral driving circuit to execute the first behavior mode after the behavior control circuit receives the initial sensing signal.

11. The emotion engine system according to claim 10, wherein the behavior control circuit drives the peripheral driving circuit to execute the second behavior mode after the behavior control circuit determines the behavior data corresponding to the second behavior mode.

12. An electronic device control method, adapted to an electronic device with an emotion engine, the electronic device control method comprising:
- providing a first behavior mode;
- generating a trigger sensing signal when a sensing unit of the electronic device is enabled;
- generating a timing signal; and
- determining a behavior data corresponding to a second behavior mode according to the timing signal, the trigger sensing signal, and the first behavior mode,
- wherein the step of determining the behavior data corresponding to the second behavior mode comprises:
  generating an emotion point and a plurality of scenario points in a virtual space,
  wherein the emotion point moves according to the timing signal, the trigger sensing signal, and the first behavior mode, and the behavior data corresponding to the second behavior mode is corresponding to the scenario point closest to the emotion point.

13. The electronic device control method according to claim 12, further comprising generating a random signal, and determining the behavior data corresponding to the second behavior mode according to the timing signal, the trigger sensing signal, the first behavior mode, and the random signal.

14. The electronic device control method according to claim 12, further comprising determining the behavior data corresponding to the first behavior mode according to an initial sensing signal.

15. The electronic device control method according to claim 14, wherein the timing signal comprises a time length information from receiving the initial sensing signal to receiving the trigger sensing signal or a system age information of the electronic device.

16. The electronic device control method according to claim 15, further comprising analyzing a type of the trigger sensing signal.

17. The electronic device control method according to claim 12, wherein the step of providing the first behavior mode comprises:
- providing the first behavior mode after receiving a power signal; and
- executing the first behavior mode.

18. The electronic device control method according to claim 12, wherein a peripheral driving unit of the electronic device is driven to execute the second behavior mode after the behavior data corresponding to the second behavior mode is determined.

19. The electronic device control method according to claim 12, further comprising:
- obtaining a corresponding emotion vector according to the first behavior mode, the timing signal, and the trigger sensing signal;
- modifying a coordinate of the emotion point in the virtual space according to the emotion vector;
- determining the scenario point closest to the emotion point; and
- determining the behavior data corresponding to the second behavior mode according to the determined scenario point.

20. The electronic device control method according to claim 19, further comprising providing a convergence point, and in the step of modifying the coordinate of the emotion point in the virtual space according to the emotion vector, providing a regression force to allow the emotion point to move towards the convergence point.

21. The electronic device control method according to claim 20, wherein a coordinate of the convergence point is changed according to the timing signal.

22. The electronic device control method according to claim 13, wherein the virtual space is a multi-dimensional space having multiple axes, the scenario point corresponding to the new coordinate is obtained through a vector operation, and the axes of the virtual space respectively represent different emotional behaviors of the electronic device.

23. The electronic device control method according to claim 19, wherein the step of determining the behavior data corresponding to the second behavior mode according to the determined scenario point comprises providing the behavior data corresponding to the second behavior mode according to a system age information and the determined scenario point.

* * * * *